Jan. 25, 1966  A. KEDEM  3,230,595
ROD CLAMPING DEVICE
Filed June 4, 1963  2 Sheets-Sheet 1
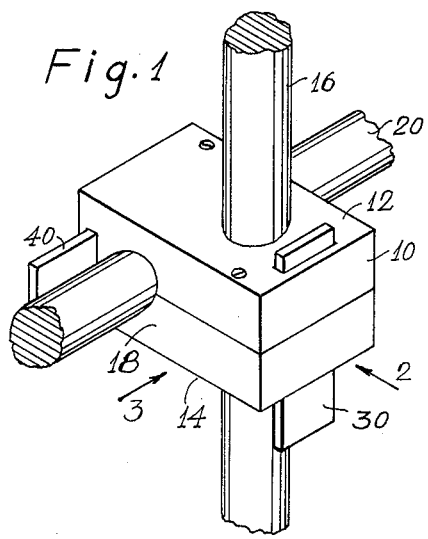
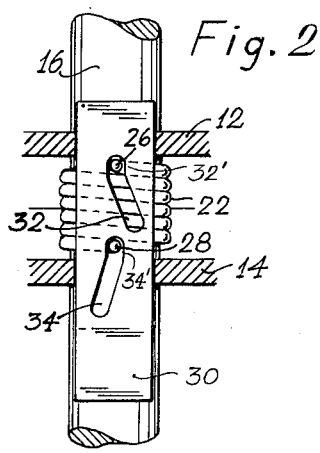
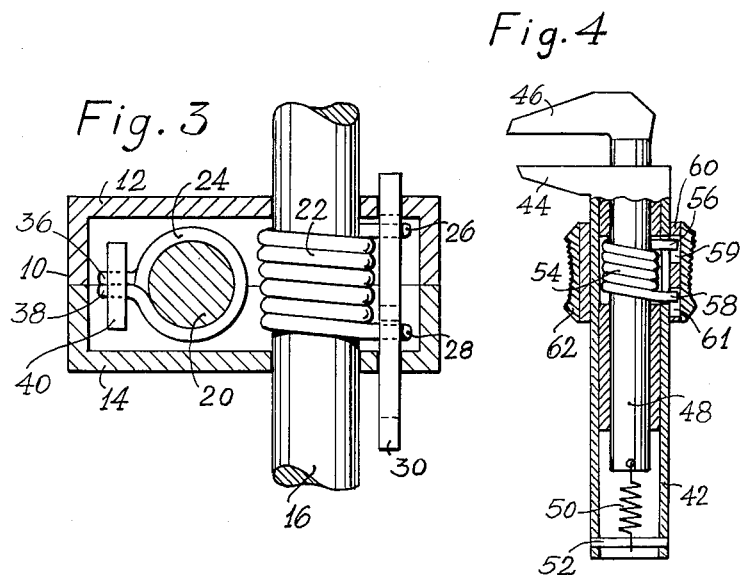
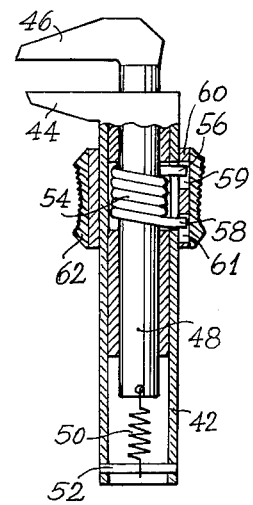
INVENTOR.
ABRAHAM KEDEM
BY
Benjamin J. David Jan. 25, 1966  A. KEDEM  3,230,595
ROD CLAMPING DEVICE
Filed June 4, 1963  2 Sheets-Sheet 2
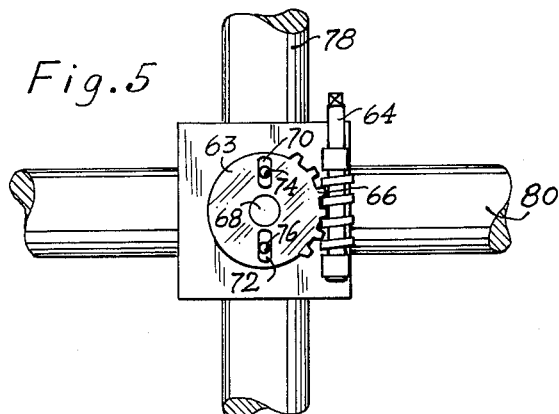
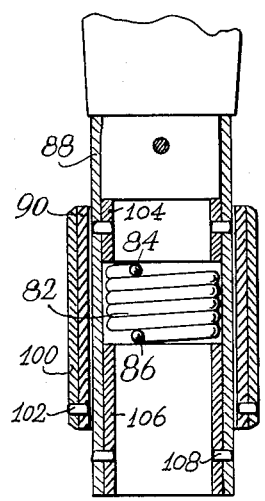
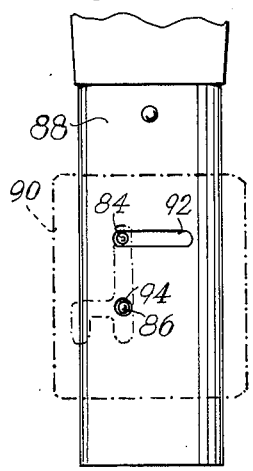
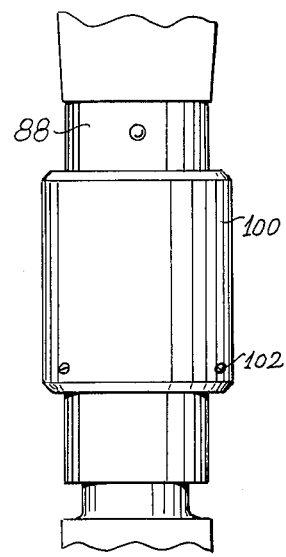
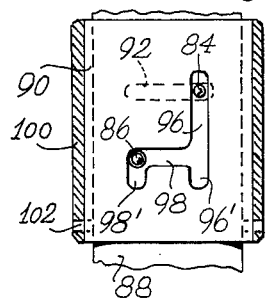
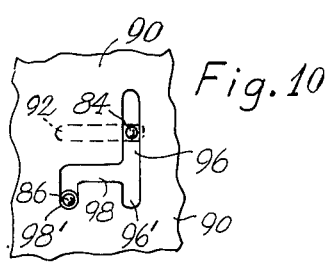
INVENTOR.
ABRAHAM KEDEM
BY

United States Patent Office 3,230,595
Patented Jan. 25, 1966

3,230,595
ROD CLAMPING DEVICE
Abraham Kedem, 19 Rechov Yaakov, Rehovot, Israel
Filed June 4, 1963, Ser. No. 285,382
4 Claims. (Cl. 24—257)

The present invention relates to a device for gripping or clamping rods, wires, or other forms of similarly-shaped members, and to tools and the like utilizing same. It is herein described with respect to several embodiments of devices for gripping and releasing rod-shaped members for use in many diverse applications.

Probably the most common form of rod clamps presently being used is one which includes a screw threaded in a supporting member into engagement with the rod to be clamped. These forms of clamps, however, engage the rod at points, and not surfaces, and therefore tend to subject the engaged points of the rod to substantial wear. Moreover, the clamping action at a point is considerably less than it would be if a greater area of the rod's surface were subjected to the gripping or clamping contact. Further, these clamps are frequently inconvenient to manipulate, particularly when the rod being clamped is of very small size.

An object of the present invention is to provide a novel clamping or gripping device for rod-shaped members and the like which has improved characteristics and properties in one or more of the respects discussed above.

A further object of the invention is to provide a tool having moveable parts which may be clamped or released by the novel clamp.

Several embodiments of the invention are illustrated by way of example in the attached drawings, in which:

FIG. 1 is a respective view of a clamp constructed in accordance with the invention for clamping two rods at right angles to each other;

FIG. 2 is a partial sectional view of the clamp of FIG. 1 taken in the direction of arrow 2;

FIG. 3 is another partial sectional view of the clamp of FIG. 1 taken in the direction of arrow 3;

FIG. 4 is a side elevational view, with parts in section, of a wrench incorporating the clamp of FIGS. 1–3;

FIG. 5 is a side elevational view of another embodiment of clamp constructed in accordance with the invention;

FIG. 6 is a top plan view of a further form of clamp constructed in accordance with the invention;

FIG. 7 is a sectional view of the clamp of FIG. 6;

FIG. 8 is a top plan view of the clamp of FIG. 6 with parts removed;

FIG. 9 is a fragmentary view partly in section of the clamp of FIG. 6, showing the parts in one position; and FIG. 10 is a fragmentary view corresponding to FIG. 9 but illustrating the parts in a second position.

One form of clamp constructed in accordance with the invention is illustrated in FIGS. 1–3, this clamp being particularly designed for gripping and releasing a pair of rod-shaped members at right angles to each other.

The clamp comprises a housing 10 having a pair of aligned openings extending through the top and bottom walls, 12 and 14 respectively, adapted to receive one of the rod-shaped members 16. Housing 10 is further formed with a second pair of openings extending through side walls 18 adapted to receive the second rod-shaped member 20 at right angles to the first member 16. The housing contains a pair of clamping structures, one for each member 16 and 20, which enable the members to be moved to a predetermined position and then clamped in that position.

The clamping structures are best shown in FIGS. 2 and 3, wherein it is seen that a coiled spring 22 is disposed in housing 10 in alignment with the openings in the housing adapted to receive rod 16, and a second coiled spring 24 is disposed in the housing in alignment with the openings therein adapted to receive the second member 20. With reference to coiled spring 22, it is seen that this coiled spring is formed with an upstanding projection 26 at one end and a second upstanding projection 28 at the opposite end. These projections are formed by turning out the two ends of the spring. Housing 10 is formed with an opening which receives a locking plate 30. This latter opening is aligned with the opening receiving rod 16, but is spaced slightly therefrom.

Locking plate 30 is moveable from a first position which causes coiled spring 22 to grip the rod 16, to a second position which causes the coiled spring to release the rod. For this purpose, locking plate 30 is formed with a pair of slots 32 and 34, each of which engages one of the upstanding projections 26 and 28 of coiled spring 22. Slots 32 and 34 are formed so that their major portions lie at an angle to the longitudinal axis of coiled spring 22, but each terminates in a portion, identified as 32' and 34' respectively, which is substantially parallel to the longitudinal axis of the coiled spring.

The arrangement is such that when the locking plate is moved to its first position, which is the position illustrated in FIG. 2 wherein projections 26 and 28 lie in portions 32' and 34' of the slots, it displaces the projections relative to each other in the direction where the coiled spring tends to wind tighter. This, in effect, reduces the internal diameter of the coiled spring and therefore causes the latter to firmly grip the rod member 16 disposed therein. When it is desired to release the rod member, locking plate 30 is moved in the opposite direction (i.e. upwardly in the view of FIG. 2), which causes projections 26 and 28 to be displaced in the direction tending to unwind the coiled spring. This, in effect, enlarges the internal diameter of the coiled spring and thereby releases rod 16 therefrom.

The second clamping mechanism disposed in housing 10 is of the same construction and operates in the same manner, the corresponding parts which cooperate with the second rod 20 being identified in the drawings, particularly FIG. 3, by the reference numerals 24 for the coiled spring, 36 and 38 for its two unstanding projections, and 40 for the locking plate.

The clamp illustrated in FIGS. 1–3 is of simple construction and is conveniently operated to clamp and release the rods. All that is necessary is to move the locking plates 30 or 40 in one position to release the respective clamp, which permits the respective rods 16 and 20 to be moved to any desired position, and then to return in locking plates to their original position to cause the spring to grip firmly the rods. Portions 32' and 34' in the slots (FIG. 2) are formed substantially parallel to the longitudinal axis of the coiled spring so as to assure that when the locking plate is moved to its clamping position, there will be no tendency by the resiliency of the spring to cause the locking plate to return.

FIG. 4 illustrates a tool having adjustable parts incorporating the clamp of FIGS. 1–3. The tool illustrated is a form of wrench which includes a hollow handle 42 carrying a fixed jaw 44 at the top thereof, and a moveable jaw 46. The latter jaw is formed integral with a rod 48 which is telescopingly received in handle 42. Rod 48 is normally biased downwardly by a spring 50 secured at one end to the rod and at the other end to a cross pin 52 supported at the bottom of the handle 42.

The handle supports a clamping arrangement substantially the same as in FIGS. 1–3 for gripping the rod 48 in the desired position to provide the appropriate spacing between fixed jaw 44 and moveable jaw 46. This clamping arrangement includes a coiled spring 54 having a pair of upstanding projections 56 and 58, one at each end, the projections passing through an opening in the handle 42 and through a locking plate 60 formed with cam slots 59 and 61 comparable to slots 32 and 34 in the FIGS. 1–3 embodiment. Locking plate 60 is carried by a manipulatable ring 62 which is movable upwardly or downwardly to clamp or release, respectively, the rod 48 within coiled spring 54. It will be apparent that the cam slots 59 and 61 could be formed in ring 62 itself instead of in a separate locking plate.

FIG. 5 illustrates an embodiment of the invention similar to that of FIGS. 1–3 except that here the locking plate is in the form of a rotatable disc 63 which is rotated in one or the other direction by a rack 64 co-operating with pinion teeth 66 formed on a portion of the peripheral surface of disc 63. The latter disc is rotatable on shaft 68. Disc 63 is formed with a pair of slots 70 and 72, comparable to slots 32 and 34 in locking plate 30 of FIGS. 1–3. Slots 70 and 72 receive upstanding projections 74 and 76, which are comparable to projections 26 and 28 in the coiled spring of FIGS. 1–3, the coiled spring not being illustrated in the view of FIG. 5.

The purpose of the arrangement of FIG. 5 is to provide for gripping and releasing rod-shaped member 78 from a remote position, or from a power unit. In either case, rack 64 is rotated in one direction to rotate disc 63 to cause the coiled spring projections 74 and 76 to be displaced to their clamping position, and rotated in the opposite direction to causes coiled spring projections 74 and 76 to be displaced to their releasing position.

The same structure may be found at the opposite side of the mechanism illustrated in FIG. 5 for clamping and releasing the second rod 80.

FIGS. 6–10 illustrate a further embodiment of the invention. In this embodiment, particularly as shown in FIG. 7, there is provided the coiled spring 82 having a pair of upstanding projections 84 and 86, one at each end, the spring adapted to receive a rod member therein (not shown) in the same manner as in the previously described embodiments. The rod member might be an interchangeable screw driver head, for example, and the elements illustrated might constitute the handle for the screw driver.

The arrangement for causing the coiled spring 82 to move into gripping and releasing positions is somewhat different in this embodiment than in the previously described ones. In the FIGS. 6–10 embodiment, there is provided a first sleeve 88 overlying the coiled spring 82 and a second sleeve 90 overlying sleeve 88. Sleeve 88 is formed with a slot 92 elongated in the direction perpendicular to the longitudinal axis of the spring 82, slot 92 being adapted to receive projection 84 of the coiled spring (see FIG. 8). Sleeve 88 is further formed with an opening 94 adapted to receive projection 86 of the coiled spring.

The second sleeve 90 which overlies sleeve 88 is also formed with a slotted arrangement, the slots in this sleeve comprising one 96 which is parallel to the longitudinal axis of the coiled spring 82, and a second slot 98 connected to the first slot 96, slot 98 being perpendicular to the longitudinal axis of coiled spring 82. Sleeve 90 is disposed over sleeve 88 so that projection 84 which extends through slot 92 of sleeve 88 seats in slot 96 of sleeve 90, and projection 86 which extends through opening 94 of sleeve 88 seats in slot 98 of sleeve 90. This is particularly clear in FIG. 8 which illustrates sleeve 88 in full lines and the corresponding position of sleeve 90 and its slots in broken lines.

With this arrangement, it will be seen that by rotating sleeve 90 with respect to sleeve 88, projections 84 and 86 may be displaced relative to each other to cause the coiled spring 82 to grip or to release, depending upon the direction of movement, any member that extends through the longitudinal axis of the spring.

FIGS. 7 and 8 illustrate the position of the parts where coiled spring 82 is in its released condition. To move the parts to their gripping or clamping positions, sleeve 90 is rotated (from left to right in the view of FIG. 8) until it assumes the position illustrated in FIG. 9, during which rotation projection 84 is displaced to cause the coiled spring to wind tighter and thereby to assume its clamping position. To release the clamp, sleeve 90 is rotated in the opposite direction to its original position.

As seen particularly in FIGS. 9 and 10, slots 96 and 98 of sleeve 90 are each formed with a terminal extension which is parallel to the longitudinal axis of the coiled spring 82. By this means, once the spring has been actuated to its clamping position by rotating sleeve 90 with respect to sleeve 88 (FIG. 9), it may be locked into this clamping position by shifting the sleeve 90 upwardly with respect to sleeve 88 (FIG. 10) whereupon projection 86 seats in extension 98' of slot 98. Extension 96' of slot 96 is used to receive projection 86 when it is desired to lock the clamp in its released position, which is effected by shifting sleeve 90 upwardly with respect to sleeve 88.

For ease in manipulating sleeve 90, an outer ring 100, which may be knurled, is attached to sleeve 90 by means of screws 102 or the like. A pair of spacing sleeves may be provided within sleeve 88 to space and retain the coiled spring 82 in position. These spacing sleeves, identified as 104 and 106 in FIG. 7, are attached by screws 108 or the like to sleeve 88, and are disposed one at each side of the coiled spring 82.

While the invention has been described with respect to several embodiments thereof, it will be understood that these embodiments are merely illustrative and not limiting. Many changes may be made in the described embodiments, and features of the invention, taken singly or in combination may be applied to other types of devices, such as clutches, brakes and the like, without departing from the spirit and scope of the invention as defined in the following claims.

I claim:

1. A device of the character described for gripping and releasing a rod-shaped member, comprising a coiled spring adapted to receive the rod-shaped member therein; said coiled spring being formed with first and second upstanding projections at the opposed ends thereof; and a locking device having first and second slotted portions for receiving said first and second upstanding projections respectively; each of said slot portions having a first region and a second region, each including corresponding projection engaging surfaces space separated along the length of the longitudinal spring axis an amount substantially equal to the longitudinal spacing between said upstanding projections, such that said upstanding projections are simultaneously located in said first regions when said coiled spring is in a gripping condition, and simultaneously located in said second regions when said coiled spring is in a released condition, said second regions offset from their respective first regions in a direction transverse to the longitudinal spring axis, such that both of said first and second upstanding projections at the spring ends are inwardly coiled towards said spring axis when located in said first regions, said locking device being movable in a first direction to displace said projections relative to each other into said first regions to cause substantially the entire length of said coil to wind and thereby firmly grip the rod-shaped member therein; said locking device being movable in a second direction to displace said projections in the opposite direction relative to each other into said second regions to cause said coil to unwind and thereby to release the rod-shaped member, the terminus of said first regions including a locking surface abutting said upstanding projections such that the stored energy of said spring, when in said firmly gripped condition exerts a force tending to move said locking device transverse to the spring axis, means preventing such transverse movement of the locking device, thereby locking the upstanding projections in said first regions, such that said coil spring is maintained in firm gripping engagement about the rod-shaped member.

2. A device of the character described for gripping and releasing a rod-shaped member comprising a housing; a coiled spring disposed within the housing; said housing being formed with a first opening in alignment with the longitudinal axis of said coiled spring for receiving the rod-shaped member; said coiled spring being formed of first and second upstanding projections at the opposed ends thereof; said housing being formed with a second opening spaced from said first opening; a locking plate carried by said housing and movable in said second opening from a first position to a second position; said locking plate being formed with first and second slotted portions engageable with the first and second upstanding projections respectively of said coiled spring, each of said slot portions having a first region and a second region, each including corresponding projection engaging surfaces space separated along the length of the longitudinal spring axis an amount substantially equal to the longitudinal spacing between said upstanding projections, such that said upstanding projections are simultaneously located in said first regions when said coiled spring is in a gripping condition, and simultaneously located in said second regions when said coiled spring is in a released condition, said second regions offset from their respective first regions in a direction transverse to the longitudinal spring axis, such that both of said first and second upstanding projections at the spring ends are inwardly coiled towards said spring axis when located in said first regions, so that when said locking plate is moved to its first position, it causes substantially the entire length of said coiled spring to wind tighter, causing the spring to firmly grip the rod-shaped member, and when said locking plate is moved to its second position, it causes said coiled spring to unwind, thus causing the spring to release the rod-shaped member, the terminus of said first regions including a locking surface abutting said upstanding projections such that the stored energy of said spring, when in said firmly gripped condition, exerts a force tending to move said locking plate transverse to the spring axis, means preventing such transverse movement of the locking plate, thereby locking the upstanding projections in said first regions, such that said coil spring is maintained in firm gripping engagement about the rod-shaped member.

3. A device of the character described for gripping and releasing a rod-shaped member comprising a housing; a coiled spring disposed within the housing; said housing being formed with a first opening in alignment with the longitudinal axis of said coiled spring for receiving the rod-shaped member; said coiled spring being formed with first and second upstanding projections at the opposed ends thereof; said housing being formed with a second opening spaced from said first opening; a locking plate carried by said housing and movable in said second opening from a first position to a second position; said locking plate being formed with first and second slotted portions having a first region substantially parallel to the longitudinal axis of the coiled spring and a second region disposed at an angle offset in a direction transverse to the longitudinal axis of the coiled spring, said upstanding projections are simultaneously located in said first regions when said coiled spring is in a gripping condition, and simultaneously located in said second regions when said coiled spring is in a released condition, both of said first and second upstanding projections at the spring ends are inwardly coiled when located in said first regions, so that when said locking plate is moved to its first position with the projections engaging the first regions, it causes substantially the entire length of said coiled spring to wind tighter, thus causing the spring to firmly grip the rod-shaped member, and when said locking plate is moved to its second position, it causes said coiled spring to unwind, thus causing the spring to release the rod-shaped member, the terminus of said first regions including a locking surface abutting said upstanding projections such that the stored energy of said spring, when in said firmly gripped condition, exerts a force tending to move said locking plate transverse to the spring axis, means preventing such transverse movement of the locking plate, thereby locking the upstanding projections in said first regions, such that said coil spring is maintained in firm gripping engagement about the rod-shaped member.

4. A device as set forth in claim 1, wherein said slotted portions including angular cam surfaces communicating between their respective first and second regions, such that said upstanding projections are cam actuated towards said spring axis when said locking device is moved in its first direction, and cam actuated away from said axis when said locking plate is moved in its second direction.

References Cited by the Examiner

UNITED STATES PATENTS

| 1,659,111 | 2/1928 | Lett | 292—305 X |
| 1,865,205 | 6/1932 | Palmquist | 292—37 |
| 2,511,321 | 6/1950 | Blackhall. | |
| 2,595,213 | 4/1952 | Raynor | 24—123.5 |
| 2,940,345 | 6/1960 | Farina | 81—152 |

FOREIGN PATENTS 334,093   10/1903   France.

CARL W. TOMLIN, *Primary Examiner.*